United States Patent [19]
Litwin

[11] 3,869,951
[45] Mar. 11, 1975

[54] PORTABLE POWER SAW GUIDE
[76] Inventor: William J. Litwin, 323 Church St., Newington, Conn. 06111
[22] Filed: Oct. 16, 1973
[21] Appl. No.: 406,968

[52] U.S. Cl.................. 83/745, 83/471.2, 83/454, 83/485
[51] Int. Cl............................................. B27b 9/04
[58] Field of Search ....... 83/745, 471.2, 471.3, 454, 83/455, 456, 477.1, 486

[56] References Cited
UNITED STATES PATENTS
2,773,523  12/1956  Hopla ............................... 83/471.3
2,812,786  11/1957  Hays ................................... 83/454

Primary Examiner—Donald R. Schran
Attorney, Agent, or Firm—Marden S. Gordon

[57] ABSTRACT

A tool for use as an accessory for a portable power circular saw, the tool serving as a guide for cutting squarely across a work, the guide consisting of a square having one side adaptable for positioning alongside a board, and the other side of the square slideably supporting a plate that is securable to the underside of the portable power saw.

1 Claim, 3 Drawing Figures

PATENTED MAR 11 1975　　　　　　　　3,869,951

PROVISION FOR CLAMP HERE

PORTABLE POWER SAW GUIDE

This invention relates generally to woodworking tools.

It is generally well known that it is difficult to make a precisely accurate square cut across a lumber by use of an electric portable power saw alone so that this situation is want of an improvement.

Accordingly it is a principal object of the present invention to provide a portable power saw guide attachable to the portable power saw and which permits a precisely accurate square cut across each time.

Another object of the present invention is to provide a portable power saw guide which is readily disengageable with the power saw when not needed so that the power saw can be used for other applications.

Other objects of the present invention are to provide a portable power saw guide which is simple in design, inexpensive to manufacture, rugged in construction, easy to use and efficient in operation.

These and other objects will become readily evident upon a study of the following specification together with the accompanying drawing wherein.

Figure 1:
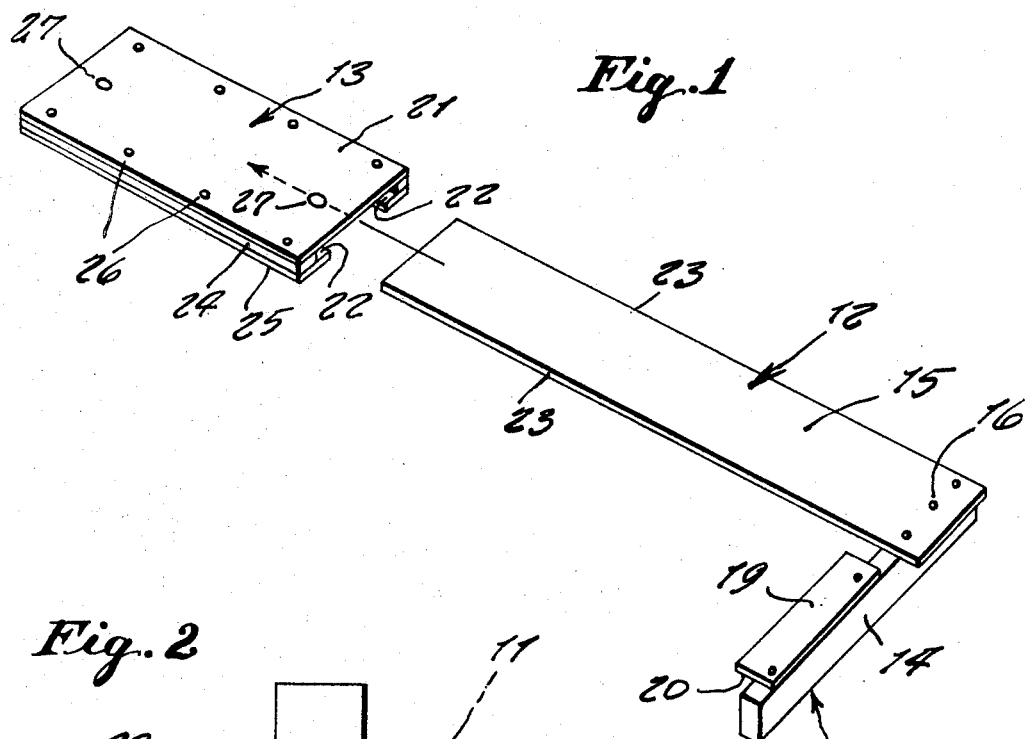
FIG. 1 is a perspective view of the units of the present invention, shown separated.

Reference is now made to the drawing in detail wherein the reference numeral 10 represents a guide, according to the present invention, for purpose of use together with a portable power saw 11.

The portable power saw guide 10 is comprised of a square unit 12 and a plate unit 13 which is slideable upon the square unit 12.

The square unit 12 includes a leg 14 and leg 15 which are rigidly secured together at 16 so that they are at an accurate 90 degree relation to each other. The leg 14 is secured to the underside of the leg 15 in order that in use, the leg 14 can be positioned alongside of an edge 17 of a lumber or board 18 while the leg 15 can be placed across the top of the lumber. A member 19 secured to an upper edge of leg 14 projects over a side edge of leg 14 in order to form a lip as shown at 20 in order that it may rest upon the upper side of lumber 18, thus maintaining the leg 14 longitudinally parallel to the board 18. The leg 15 is relatively thin and wide and may be made in any desired length so as to accommodate any desired length of cutting across a lumber.

The plate unit 13 is comprised of a rectangular flat plate member 21 which along each longitudinal side edge thereof is provided with a groove 22 therebeneath into which the opposite side edges 23 of leg 12 are slideably receivable. Each groove 22 is formed by means of a gib 24 located directly beneath the plate 21 and below which a wider plate 25 is positioned in order that it forms an inwardly extending lip so that the groove 22 is formed between the projecting lip of plate 25 and the underside of plate 21. The gib and plate 25 are secured to the plate 21 by means of a plurality of rivets 26 or the like. It is of course to be noted that the opposite side edges 23 of the leg 15 are parallel to each other and the grooves 22 accordingly are correspondingly parallel to each other.

Figure 2:
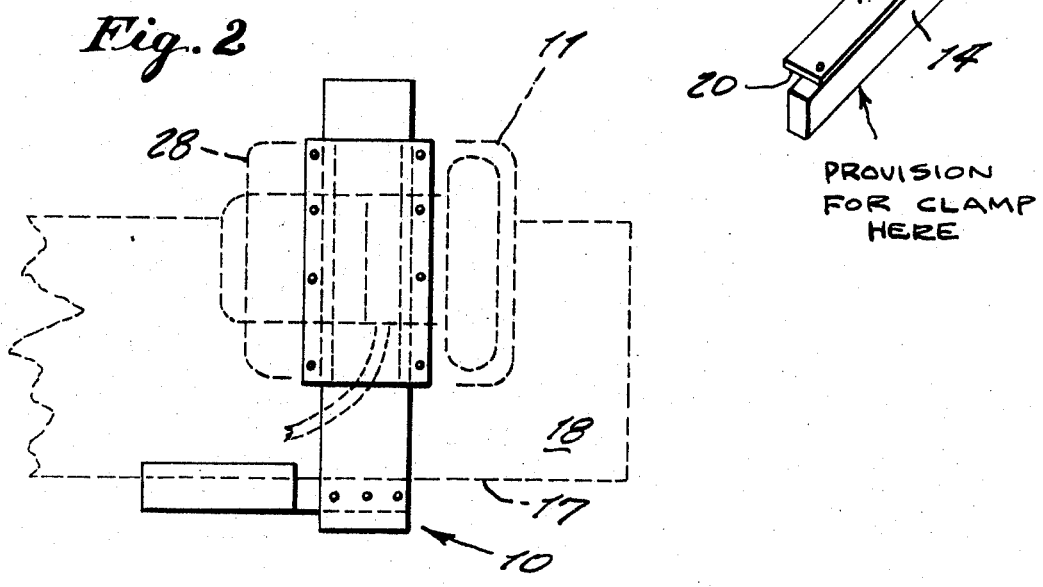
FIG. 2 is a top plan view thereof shown assembled and mounted on a portable power saw, and which furthermore is shown in an operative position to cut across a lumber.
Figure 3:
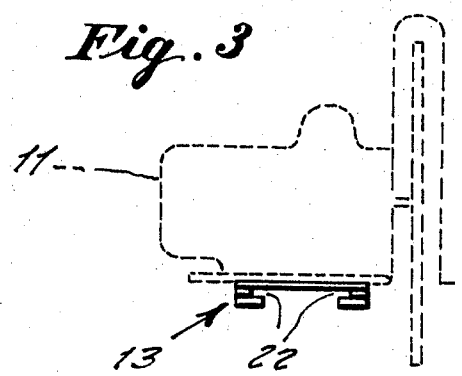
FIG. 3 is a side elevation view thereof, showing the plate unit secured to the power saw for use without the square unit.

In operative use, the plate unit 13 is secured to the underside of the portable power saw by means of mounting bolts received through mounting openings 27 of the plate unit. These mounting bolts are passed through the base plate 28 that forms an integral component of the portable power saw. In order to make a square cut across a lumber 18, the square is positioned thereupon as shown in FIG. 2 with the leg 14 being positioned along the edge 17 of lumber 18 while the leg 15 extends thereacross. The unit 13 is slideably fitted upon the leg 15 so that when the power saw is moved across the lumber, a square cut is resulted.

It is to be noted that the portable power saw together with the plate unit secured thereto can be removed from the square unit 12 so that the power saw can be used independently without the square for other sawing purposes wherein square cuts are not a requirement.

Thus there is provided a novel portable power saw guide.

It is to be noted further that provision for a clamp may be provided upon the leg 14 of the square unit 12 if so desired.

It is also to be noted that the gibs may be adjustable for wear.

It is to be noted also that the present invention may be designed applicable to other portable power tools other than just a power circular saw.

What I now claim is:

1. A guide device intended for use as an accessory for a portable power circular saw to guide the saw squarely across a piece of lumber being cut in a cross cut manner, the guide device comprising, in combination:

a square unit and a saw mounting plate unit reciprocally slidable longitudinally therealong;

said square unit comprising:

an elongated rectangularly shaped leg having a flat vertical interior surface, a flat vertical exterior surface, flat horizontally extending top and bottom edges, a front vertical end, and a back vertical end;

a flat rectangularly shaped elongated guide member generally of a board shape and having a flat horizontally extending top surface, a flat horizontally extending bottom surface, opposed flat parallely extending side edges, and opposed front and back edges;

fastening means affixing said back end edge of said guide member to said back end portion of said top edge of said leg with said guide member overlapping said leg and said guide member extending outwardly of the interior surface of said leg at a ninety degree engle thereto;

a flat elongated rectangularly shaped lip forming member having a flat horizontal top surface, a flat horizontal bottom surface, transversely opposed longitudinally extending parallel side edges, and longitudinally spaced apart transversely extending front and back edges;

fastening means affixing said lip forming member to said top edge of said leg extending longitudinally therealong with said lip forming bottom surface in juxtaposition with said leg top edge, the lip forming member extending outwardly over the interior surface of said leg member to overlap the same and form a horizontal lip therewith which extends at a ninety degree angle to the interior surface of the leg member;

said plate unit comprising:
  a flat rectangularly shaped plate member having a flat smooth horizontal top surface, a flat horizontal bottom surface, opposed parallel side edges, and opposed parallel front and back edges;
  a pair of centrally spaced longitudinally spaced apart apertures extending through said plate member;
  a pair of mounting bolts, each bolt associated with one of said plate member apertures and adapted to pass therethrough for detachably securing said plate member to a base portion of the portable power circular saw with the side edges of the plate member extending parallel to the plane defined by the circular blade of the circular saw;
  a pair of transversely spaced apart longitudinally extending gib members each of an elongated rectangular shape with each extending along an opposite side edge of said plate member between opposite end edges thereof and in juxtaposition with the flat bottom surface thereof;
  the spacing between interior confronting side edges of said gib members being slightly greater than the width of said guide member of said square unit;
  the thickness of each of said gib members being identical to each other and being slightly greater than the thickness of said guide member of said square unit;
  a pair of flat elongated rectangularly shaped holding members each extending along a bottom surface of one of the gib members longitudinally of the plate member and overlapping the interior side edges of the gib members such that a pair of grooves having a generally U-shaped cross-sectional configuration are defined between the gib members, holding members, and bottom surface of the plate member;
  means disposed at spaced intervals along the side edges of the plate member and affixing the gib member and said holding member thereto;
said plate unit being reciprocally slidable along said guide member of said square unit which is movably received in said plate unit grooves so that when said square unit guide member is positioned against an upper surface of the piece of lumber to be cut with said square unit leg positioned alongside said piece of lumber with said lip member resting on said upper side of said lumber and said leg interior surface engaging the adjacentmost edge of said piece of lumber then the saw secured to the edge unit is guided thereby in a manner normal to the longitudinal axis of the wood to provide an accurate cross-cut of the wood.

* * * * *